US010142764B2

(12) United States Patent
    Lim

(10) Patent No.: US 10,142,764 B2
(45) Date of Patent: Nov. 27, 2018

(54) METHOD AND SYSTEM FOR OVERLAY DISPLAY CONTROL

(71) Applicants:NHN Entertainment Corporation, Seongnam-si (KR); NHN Studio629 Corporation, Seongnam-si (KR)

(72) Inventor: Chuljae Lim, Seongnam-si (KR)

(73) Assignees: NHN Entertainment Corporation, Seongnam-si (KR); NHN Studio629 Corporation, Seongnam-si (KR)

( * ) Notice: Subject to any disclaimer, the term of this patent is extended or adjusted under 35 U.S.C. 154(b) by 0 days.

(21) Appl. No.: 15/272,422

(22) Filed: Sep. 21, 2016

(65) Prior Publication Data
    US 2017/0086009 A1    Mar. 23, 2017

(30) Foreign Application Priority Data
    Sep. 21, 2015  (KR) ........................ 10-2015-0133435

(51) Int. Cl.
    *G06F 1/00*     (2006.01)
    *H04W 4/00*     (2018.01)
    (Continued)

(52) U.S. Cl.
    CPC ........... *H04W 4/001* (2013.01); *A63F 13/533* (2014.09); *H04L 67/125* (2013.01); *H04L 67/34* (2013.01);
    (Continued)

(58) Field of Classification Search
    CPC ........ G06F 1/16; G06F 3/0488; G06F 17/211; H04L 67/02; A63F 13/35; A63F 13/537
    See application file for complete search history.

(56) References Cited

U.S. PATENT DOCUMENTS

| 7,346,846 B2 | 3/2008 | Rossi, Jr. et al. |
| 9,207,859 B2 | 12/2015 | Woo et al. |
| (Continued) |

FOREIGN PATENT DOCUMENTS

| JP | 2005-339560 | 12/2005 |
| JP | 2007-328488 | 12/2007 |
| (Continued) |

OTHER PUBLICATIONS

The Japanese Office Action dated Aug. 15, 2017, by the Japanese Patent Office corresponding to Japanese Patent Application No. 2016-176619.

*Primary Examiner* — Michael Faragalla
(74) *Attorney, Agent, or Firm* — H.C. Park & Associates, PLC

(57) ABSTRACT

A method of providing an overlay display control performed on an electronic device, the method including: displaying a progress screen of a main service associated with an application through a first virtual layer under control of the application executed on the electronic device; displaying a user interface on a preset area of the first virtual layer, the user interface configured to receive a selection signal on a control function associated with the main service; displaying a second virtual layer for providing an additional service associated with the main service overlapping the first virtual layer in response to a progress of the main service meeting a preset condition; and processing a progress of the additional service, including: hooking a selection signal input on a partial area of the second virtual layer; and calling a control function corresponding to the partial area of the second virtual layer.

10 Claims, 10 Drawing Sheets

(51) Int. Cl.
  *H04L 29/08*     (2006.01)
  *A63F 13/533*    (2014.01)
  *H04L 29/06*     (2006.01)
  *H04W 4/50*      (2018.01)

(52) U.S. Cl.
  CPC .............. *H04L 67/38* (2013.01); *H04W 4/50* (2018.02); *A63F 2300/209* (2013.01)

(56) References Cited

U.S. PATENT DOCUMENTS

| | | | |
|---|---|---|---|
| 2011/0271185 A1 | 11/2011 | Chen et al. | |
| 2014/0372938 A1 | 12/2014 | Park | |
| 2015/0135044 A1* | 5/2015 | Morita | G06F 17/211 715/202 |
| 2015/0261253 A1* | 9/2015 | Kamijima | G06F 1/162 345/173 |
| 2015/0301707 A1* | 10/2015 | Tasnadi | G06F 3/0484 715/771 |

FOREIGN PATENT DOCUMENTS

| | | |
|---|---|---|
| JP | 2014-171869 | 9/2014 |
| JP | 2015-095256 | 5/2015 |
| KR | 10-2012-0034302 | 4/2012 |
| KR | 2012/0034302 | 4/2012 |
| KR | 10-2014-0145894 | 12/2014 |
| KR | 2014/0145894 | 12/2014 |
| WO | 2009017125 | 2/2009 |

\* cited by examiner

METHOD AND SYSTEM FOR OVERLAY DISPLAY CONTROL

CROSS-REFERENCE TO RELATED APPLICATION

This application claims priority from and the benefit of Korean Patent Application No. 10-2015-0133435 filed on Sep. 21, 2015, which is hereby incorporated by reference for all purposes as if fully set forth herein.

BACKGROUND

Field

One or more exemplary embodiments relate to an overlay display control method and system.

Discussion of the Background

A variety of services are provided through an application installed on an electronic device. However, to provide an additional service, the electronic device needs to instruct an existing service to access code for the additional service by further adding a large amount of branch syntax to an existing source code in addition to simply adding code for the additional service. Accordingly, it is very complex to add source code to provide the additional service to the existing service.

For example, in the case of adding a new tutorial service or a new quest service within an existing game service, a plurality of branch codes need to be added to the existing source code so that the existing source code may be branched out to a new source code for the new tutorial service or the new quest service in order to proceed with the new tutorial service or the new quest service while a game is in progress. In this case, developers need to retrieve each branch code and correct the code every time game content is added or modified.

The above issue makes it difficult to maintain and manage a source code. Further, due to increased number of branches, an absolute code amount of the source code is also increased and the additional service may not be quickly applied.

The above information disclosed in this Background section is only for enhancement of understanding of the background of the inventive concept, and, therefore, it may contain information that does not form the prior art that is already known in this country to a person of ordinary skill in the art.

SUMMARY

One or more exemplary embodiments provide an overlay display control method and system that may reduce an in-code branch amount and a total code amount, and quickly apply and produce an additional service by separately managing, processing, and analyzing an existing source code and a source code for the additional service.

Additional aspects will be set forth in the detailed description which follows, and, in part, will be apparent from the disclosure, or may be learned by practice of the inventive concept.

An exemplary embodiment discloses a method of providing an overlay display control performed on an electronic device, the method including: displaying a progress screen of a main service associated with an application through a first virtual layer under control of the application executed on the electronic device; displaying a user interface on a preset area of the first virtual layer, the user interface configured to receive a selection signal on a control function associated with the main service; displaying a second virtual layer for providing an additional service associated with the main service overlapping the first virtual layer in response to a progress of the main service meeting a preset condition; and processing a progress of the additional service, including: hooking a selection signal input on a partial area of the second virtual layer; and calling a control function corresponding to the partial area of the second virtual layer.

An exemplary embodiment also discloses a method of providing an overlay display control including: transmitting a server signal including information about at least a portion of registered applications to an electronic device of a user over a network; receiving an electronic device signal and verifying information about an application selected at the electronic device from the electronic device signal; and transmitting an installation file of the selected application to the electronic device, wherein the installation file includes a first source code and a second source code, wherein the electronic device is configured to process a progress of a main service using the first source code in response to an execution of the application, and process a progress of an additional service using the second source code in response to the progress of the main service meeting a preset condition, and wherein, in response to the progress of the additional service, the electronic device is configured to process the progress of the additional service by hooking an input on a user interface displayed on a screen of the electronic device to the first source code using the second source code, and by calling a control function of the first source code preset with the second source code.

An exemplary embodiment further discloses a system of a server for providing an overlay display control including: a memory configured to store computer-readable instructions; and one or more processors configured to execute the computer-readable instructions, wherein the one or more processors are configured to control the server to provide information about at least a portion of registered applications to an electronic device of a user in response to a request received from the electronic device of the user over a network, and to transmit an installation file of an application selected at the electronic device to the electronic device over the network, wherein the installation file includes a first source code and a second source code, wherein the electronic device is configured to process a progress of a main service using the first source code in response to an execution of the application and process a progress of an additional service using the second source code in response to the main service meeting a preset condition, and wherein, in response to the progress of the additional service, the electronic device is configured to process the progress of the additional service by hooking an input received on a user interface displayed on a screen of the electronic device to the first source code using the second source code, and by calling a control function of the first source code preset with the second source code using the second source code.

The foregoing general description and the following detailed description are exemplary and explanatory and are intended to provide further explanation of the claimed subject matter.

BRIEF DESCRIPTION OF THE FIGURES

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

Figure 1:
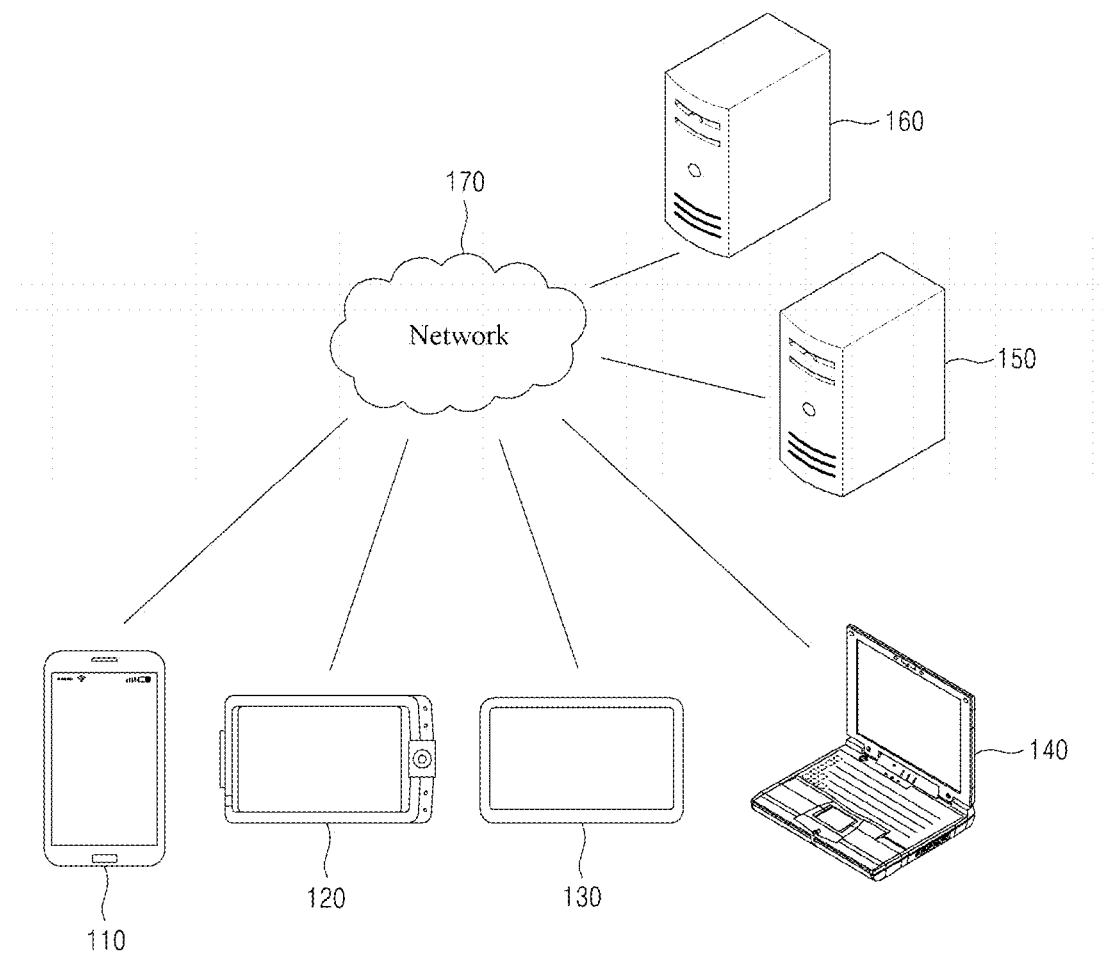
FIG. 1 is a diagram illustrating an example of a network environment according to at least one exemplary embodiment.

It should be noted that these figures are intended to illustrate the general characteristics of methods and/or structure utilized in certain exemplary embodiments and to supplement the written description provided below. These drawings are not, however, to scale and may not precisely reflect the precise structural or performance characteristics of any given embodiment, and should not be interpreted as defining or limiting the range of values or properties encompassed by exemplary embodiments.

DETAILED DESCRIPTION

One or more exemplary embodiments will be described in detail with reference to the accompanying drawings. Exemplary embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some exemplary embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of" when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which exemplary embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Exemplary embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more exemplary embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more exemplary embodiments, computer processing devices may be described as including various functional units that perform various operations and/or functions to increase the clarity of the description. However, computer processing devices are not intended to be limited to these functional units. For example, in one or more exemplary embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more exemplary embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the exemplary embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the exemplary embodiments, or they may be known devices that are altered and/or modified for the purposes of exemplary embodiments.

A hardware device, such as a computer processing device, may run an operating system (OS) and one or more software applications that run on the OS. The computer processing device also may access, store, manipulate, process, and create data in response to execution of the software. For simplicity, one or more exemplary embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of exemplary embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, exemplary embodiments will be described with reference to the accompanying drawings.

FIG. 1 is a diagram illustrating an example of a network environment according to at least one exemplary embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, the electronic device 110 may communicate with other electronic devices 120, 130, and/or 140, and/or the servers 150 and/or 160 over the network 170, including a wired communication or a wireless communication.

The communication scheme is not particularly limited and may include a communication method that uses a near field communication between devices as well as a communication method using a communication network, for example, a mobile communication network, the wired Internet, the wireless Internet, and a broadcasting network. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the exemplary embodiments are not limited thereto.

Each of the servers 150 and 160 may be a computer apparatus or a plurality of computer apparatuses that provides instructions, codes, file, contents, services, and the like, through communication with the plurality of electronic devices 110, 120, 130, and/or 140 over the network 170.

For example, the server 150 may provide a file for installing an application to the electronic device 110 connected over the network 170. In this case, the electronic device 110 may install the application using the file provided from the server 150. Also, the server 150 may connect to the server 160 and receive a service or content provided from the server 160 under control of at least one program, for example, a browser or the installed application, and an operating system (OS) included in the electronic device 110. For example, once the electronic device 110 transmits a service request message to the server 160 over the network 170 under control of the application, the server 160 may transmit a code corresponding to the service request message to the electronic device 110 and the electronic device 110 may provide a service or content to a user by configuring and displaying a screen corresponding to the code under control of the application. For example, the server 160 may set a communication session for a messaging service, and may route message transmission and reception between the plurality of electronic devices 110, 120, 130, and/or 140 through the set communication session.

Figure 2:
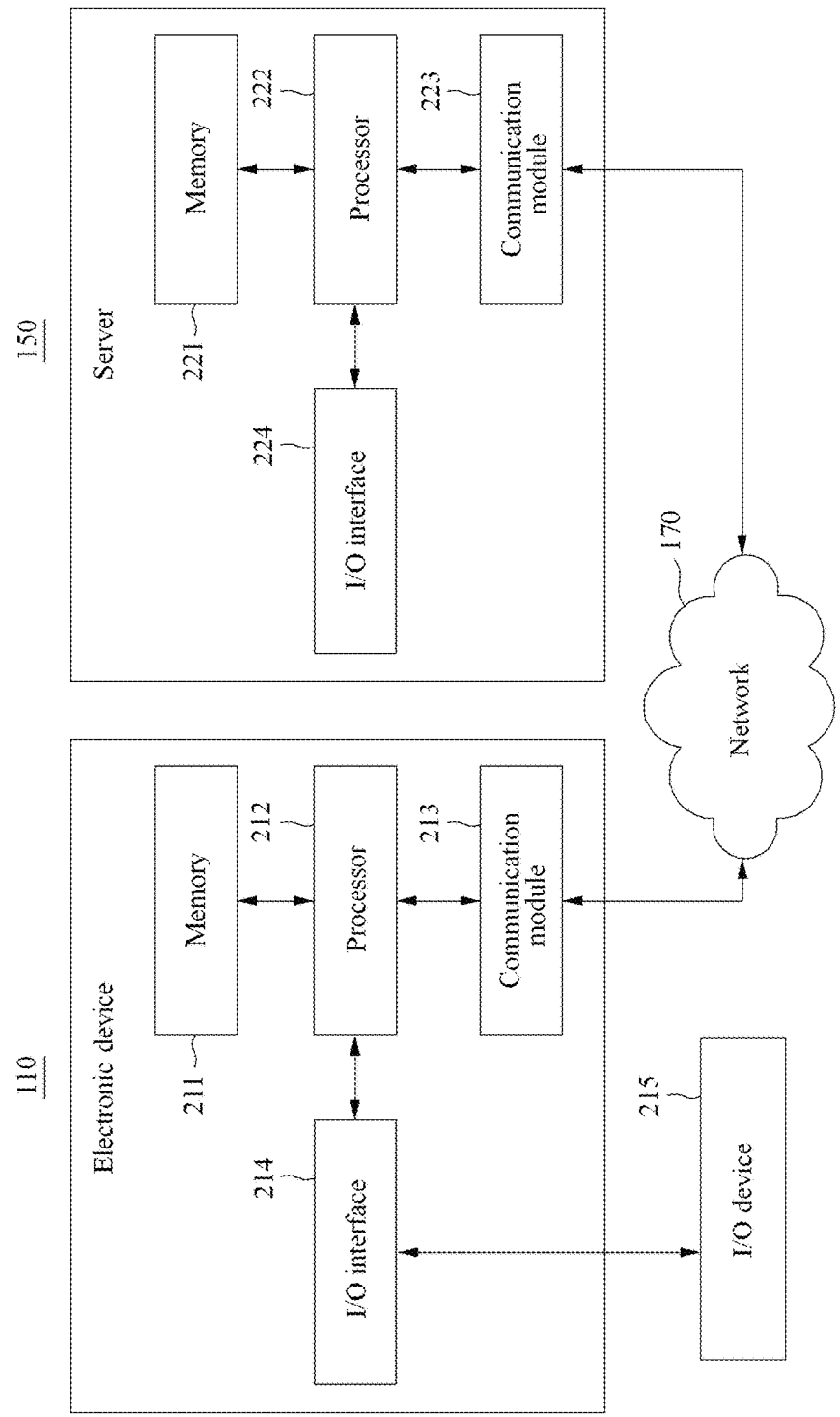
FIG. 2 is a block diagram illustrating an electronic device and a server according to at least one exemplary embodiment.

FIG. 2 is a block diagram illustrating an example of an electronic device and a server according to at least one exemplary embodiment. FIG. 2 illustrates an exemplary configuration including the single electronic device 110 the single server 150, but the exemplary embodiments are not limited thereto. For example, other electronic devices 120, 130, and/or 140, or the server 160 may be configured to have the same or similar configuration.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211 and 221 may include a permanent mass storage device, such as random access memory (RAM), read only memory (ROM), a disk drive, etc., as a computer-readable storage medium. Also, an OS and at least one program code, for example, the aforementioned code for browser or the application installed and executed on the electronic device 110, may be stored in the memory 211 and 221. Such software may be loaded from another computer-readable storage medium separate from the memory 211 and 221 using a drive mechanism. The other computer-readable storage medium may include, for example, a floppy drive, a disk, a tape, a DVD/CD-ROM drive, a memory card, etc. According to exemplary embodiments, software may be loaded to the memory 211 and 221 through the communication module 213 and 223, instead of, or in addition to, the computer-readable storage medium. For example, at least one program code may be loaded to the memory 211 and 221 based on a software, for example, the application, installed by files provided over the network 170 from developers or a file distribution system, for example, the server 160, which provides an installation file of the application.

The processor 212 and 222 may be configured to process computer-readable instructions, for example, the aforementioned at least one program code, of a computer program by performing basic arithmetic operations, logic operations, and I/O operations. The computer-readable instructions may be provided from the memory 211 and 221 and/or the communication module 213 and 223 to the processor 212 and 222. For example, the processor 212 and 222 may be configured to execute received instructions in response to the program code stored in the storage device, such as the memory 211 and 221.

The communication module 213 and 223 may provide a communication between the electronic device 110 and the server 150 over the network 170. The communication module 213 may also provide the electronic device 110 with a communication with another electronic device, for example, the electronic device 120 and/or another server, for example, the server 160. For example, the processor 212 of the electronic device 110 may transfer a request, for example, a streaming service request for content, generated based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214 and 224 may be an interface device with an I/O device 215. For example, an input device may include a keyboard, a mouse, etc., and an output device may include a device, such as a display for displaying a communication session of an application. The I/O interface 214 may also be an interface device including an apparatus having both the input function and the output function integrated, such as a touch screen. In detail, when processing instructions of the computer program loaded to the memory 211, the processor 212 of the electronic device 110 may display a service screen based on data from the server 150 or the electronic device 120 or a content on a display through the I/O interface 214.

According to exemplary embodiments, the electronic device 110 and the server 150 may include a greater or smaller number of constituent elements than the number of constituent elements shown in FIG. 2, and the exemplary embodiments are not limited thereto. For example, the electronic device 110 may include at least a portion of the I/O device 215, or may further include other constituent elements, for example, a transceiver, a global positioning system (GPS) module, a camera, a variety of sensors, a database, and the like.

Figure 3:
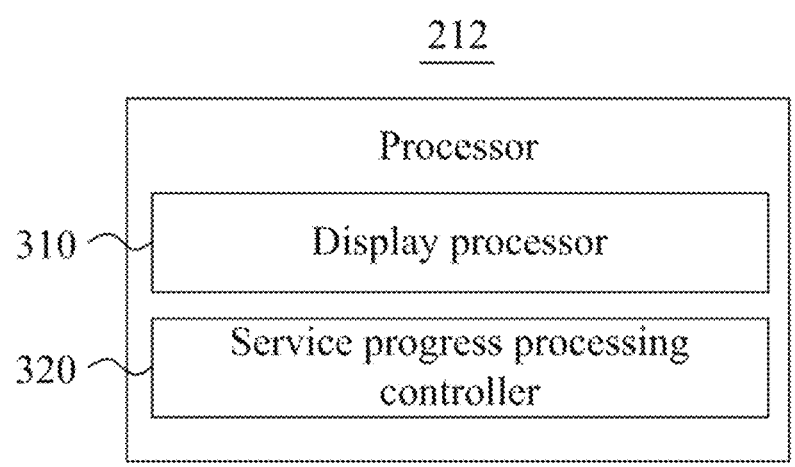
FIG. 3 is a block diagram illustrating an example of a processor of an electronic device according to at least one exemplary embodiment.
Figure 4:
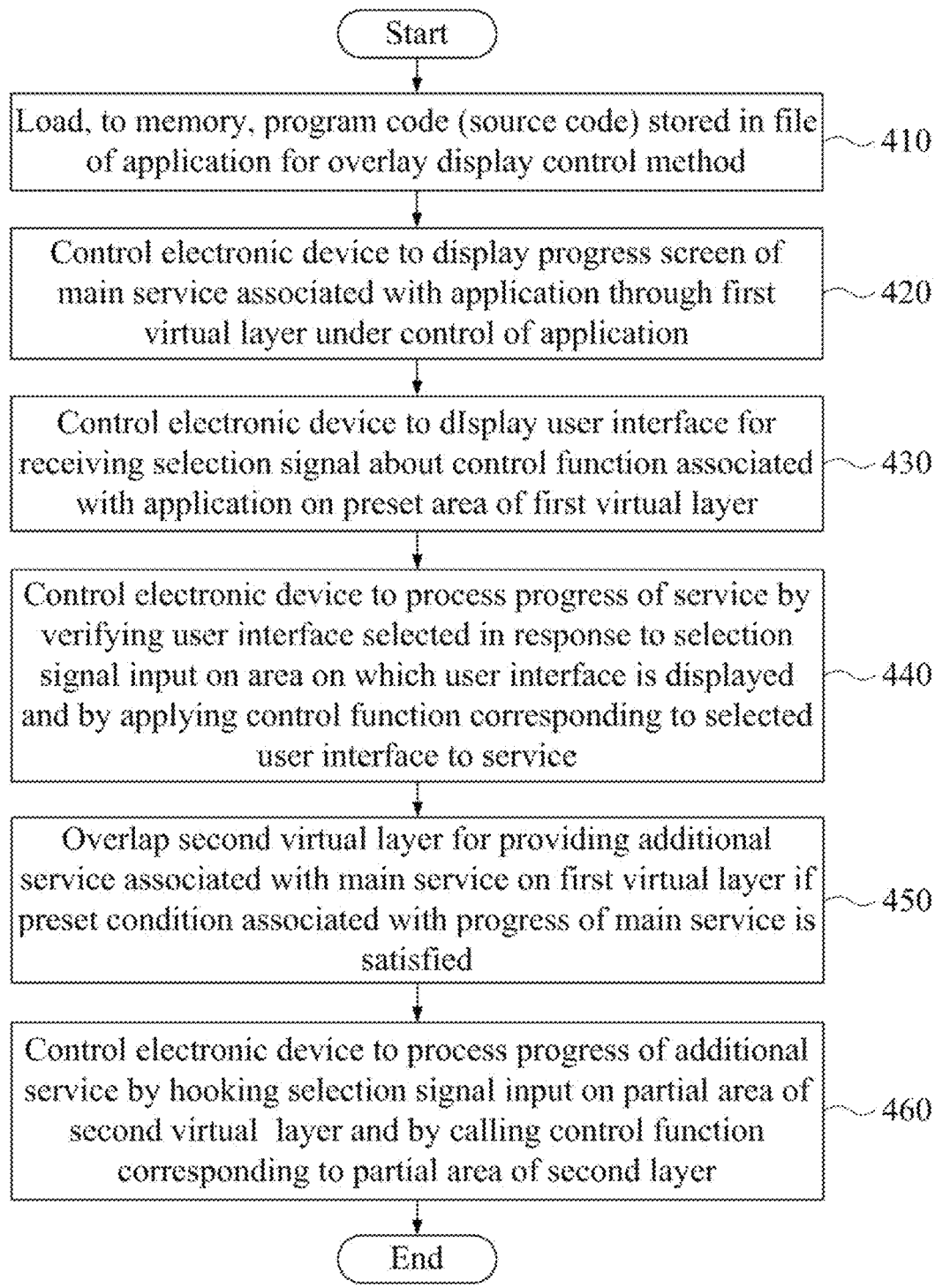
FIG. 4 is a flowchart illustrating an example of a method performed at an electronic device according to at least one exemplary embodiment.

FIG. 3 is a block diagram illustrating an example of a processor of an electronic device according to at least one exemplary embodiment, and FIG. 4 is a flowchart illustrating an example of a method performed at an electronic device according to at least one exemplary embodiment. Referring to FIG. 3, the processor 212 of the electronic device 110 may include a display processor 310 and a service progress processing controller 320. The processor 212 may control the electronic device 110 to perform operations 410 through 460 of FIG. 4, and may be configured to execute at least one program code and a code of an OS included in the memory 211.

In operation 410, the processor 212 may load, to the memory 211, a program code, for example, a source code, stored in a file of an application for the overlay display control method. For example, a program file of the application may be provided by a file distribution server over a network, and may be used to install the application on the electronic device 110. In response to execution of the application installed on the electronic device 110, the processor 212 may load the program code to the memory 211. Here, the processor 212 including the display controller 310 and the service progress processing controller 320 may be configured to perform operations 420 through 460 by executing at least one of the display controller 310 and the service progress processing controller 320 corresponding to the program code loaded to the memory 211. The constituent elements of the processor 212 controlling the electronic device 110 may be understood as the processor 212 controlling other constituent elements of the electronic device 110. For example, the processor 212 may control the electronic device 110 to receive data from the server 160 by controlling the communication module 213 of the electronic device 110.

In operation 420, the display controller 310 may control the electronic device 110 to display a progress screen of a main service associated with the application on a first virtual layer under control of the application. For example, the display controller 310 may display the progress screen of the main service, for example, a game screen of a game service, on the first virtual layer by executing the source code loaded to the memory 211.

In operation 430, the display controller 310 may control the electronic device 110 to display a user interface for receiving a selection signal about a control function associated with the main service on a preset area of the first virtual layer. For example, the progress screen of the main service may be displayed through a 1-1 virtual layer and a progress screen of the user interface may be configured through a 1-2 virtual layer and overlappingly displayed on the 1-1 virtual layer. The 1-1 virtual layer and the 1-2 virtual layer may be included in the first virtual layer.

In operation 440, the service progress processing controller 320 may control the electronic device 110 to process a progress of the main service by verifying a user interface selected in response to the received selection signal input on the area on which the user interface is displayed and by applying a control function corresponding to the selected user interface to the main service. For example, a user interface in a game service may be input icons associated with control of a character, a use of a skill, a game menu, and the like. The service progress processing controller 320 may process the progress of the main service based on a signal, for example, the selection signal that occurs in response to a user input through the user interface. Here, the progress of the main service may proceed in association with the server 160 that provides the main service associated with the application. In this case, the service progress processing controller 320 may further control the electronic device 110 to process communication with the server 160 and the like.

In operation 450, if a preset condition associated with the progress of the main service is satisfied, the display controller 310 may overlap a second virtual layer for providing an additional service associated with the main service on the first virtual layer. For example, a call function for calling the control function may be associated with a partial area of the second virtual layer. In this case, the additional service may be provided in at least the partial area of the second virtual layer, and the partial area may be transparently display at least a portion of the progress screen of the first virtual layer and at least a portion of the user interface. The call function may be displayed on the area for providing the additional service and may also be displayed on the transparent area.

In operation 460, the service progress processing controller 320 may control the electronic device 110 to process a progress of the additional service by hooking the selection signal input on the partial area of the second virtual layer and calling a control function corresponding to the partial area of the second virtual layer. As described above, although the second virtual layer overlaps the first virtual layer, at least a portion of the user interface on the first virtual layer may be displayed through the partial area of the second virtual layer for the user. The user may select the user interface on the first virtual layer which is overlapped by the call function on the second virtual layer while using the additional service. In this case, the service progress processing controller 320 may intercept the selection signal input through the user interface to execute the call function associated on the corresponding area of the second virtual layer. Accordingly, the user interface on the first virtual layer is not executed. Also, the service progress processing controller 320 may process the progress of the additional service by calling and processing the control function corresponding to the call function, for example, the control function associated with the main service.

Here, the call function corresponding to the control function may be a call function corresponding to the user interface displayed on an area on which the selection signal is input, and may be a control function preset to the call function, for example, the partial area of the second virtual layer, regardless of the user interface displayed on the first virtual layer in the area on which the selection signal is input. For example, while the game service is providing a tutorial as the additional service on the second virtual layer, a user may select a skill button A of an existing game service on the first virtual layer. In response to a user selection on a user interface corresponding to the skill button A, the service progress processing controller 320 may hook the selection signal using a call function associated on an area of the second virtual layer corresponding to skill button A of the first virtual layer, and may call the control function corresponding to the skill button A of the first virtual layer. On the other hand, we may need to prevent the user from using the skill button A and to induce the user to use skill button B. In this case, the service progress processing controller 320 may hook the selection signal received in an area not corresponding with skill button B and may call a control function for displaying a message "please press the skill button B" on the screen.

In more detail, the main service may include a game service provided to the electronic device 110 through the application. Here, the additional service may include at least one of a tutorial and a quest that are additionally provided through the game service. In this case, in operation 460, the service progress processing controller 320 may process a progress of the tutorial or the quest by calling a control function of the game service through the call function associated with the partial area of the second virtual layer on which a progress screen of the tutorial or the quest is displayed.

Also, in operation 460, the service progress processing controller 320 may prevent a selection signal input received on an area other than the area on which the call function is displayed on the second virtual layer. In this manner, the electronic device 110 may prevent an unnecessary input while providing the additional service.

The source code of the application installed and executed on the electronic device 110 may include a first source code and a second source code.

The first source code may include an instruction or a program code for controlling the electronic device 110 to display a first virtual layer for providing the main service, an instruction for controlling the electronic device 110 to display the user interface through the first virtual layer, and an instruction for controlling the electronic device 110 to process a control function corresponding to the user interface. For example, the instructions may be configured in a form of functions within the first source code.

The second source code may be generated to provide the additional service, separate from the first source code. For example, once the first source code is provided to be electronic device 110 in a form of a first file, the second source code may be provided to the electronic device 110 through a separate second file. Alternatively, both the first and second files separately including the first source code and second source code may be provided to the electronic device 110 at the same time. The second source code may include an instruction for controlling the electronic device 110 to display the second virtual layer and an instruction for controlling the electronic device 110 to provide a function for calling the control function. Here, the second source code may include an instruction for controlling the electronic device 110 to call the control function corresponding to the partial area of the second virtual layer using the first source code.

Figure 5:
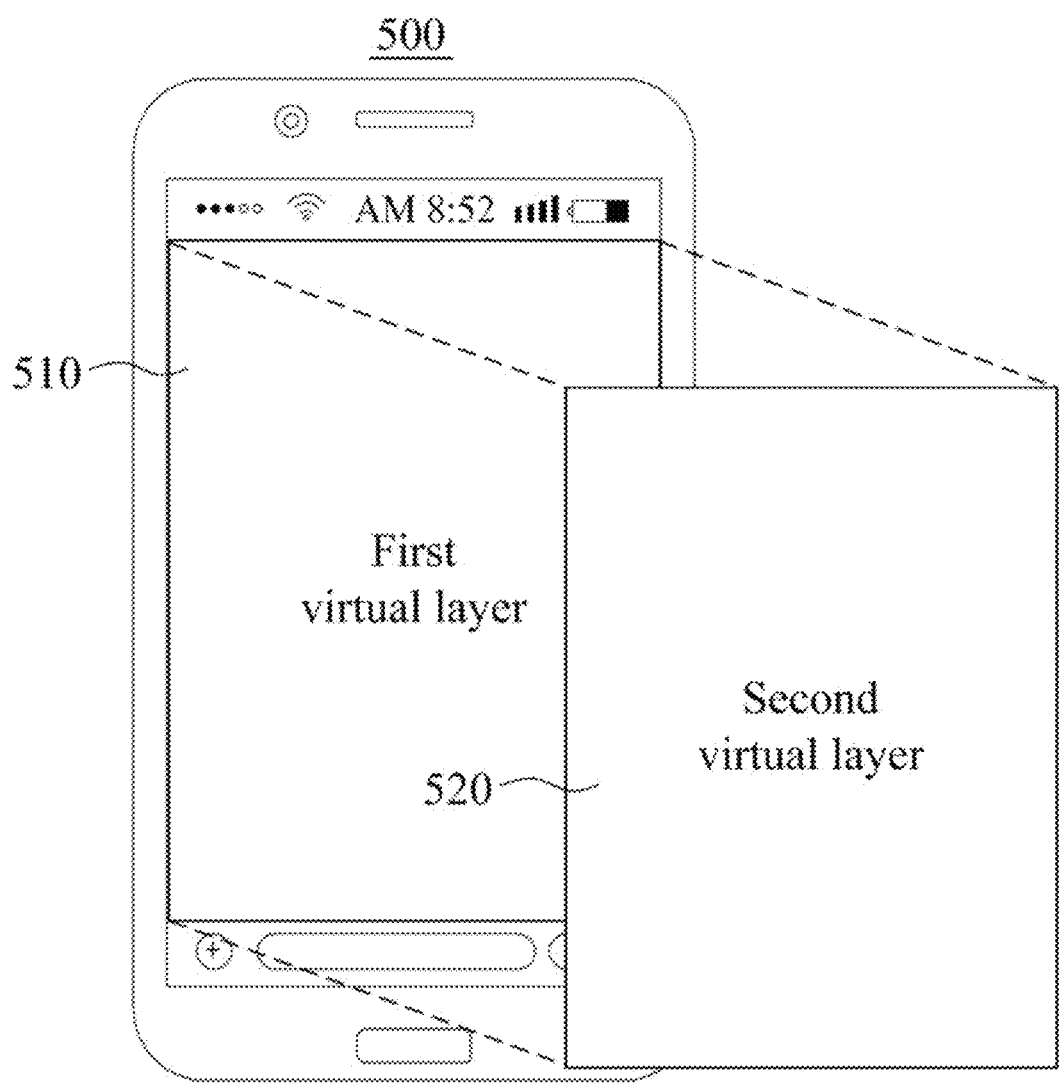
FIGS. 5 and 6 illustrate examples of a first virtual layer and a second virtual layer according to at least some exemplary embodiments.
Figure 6:
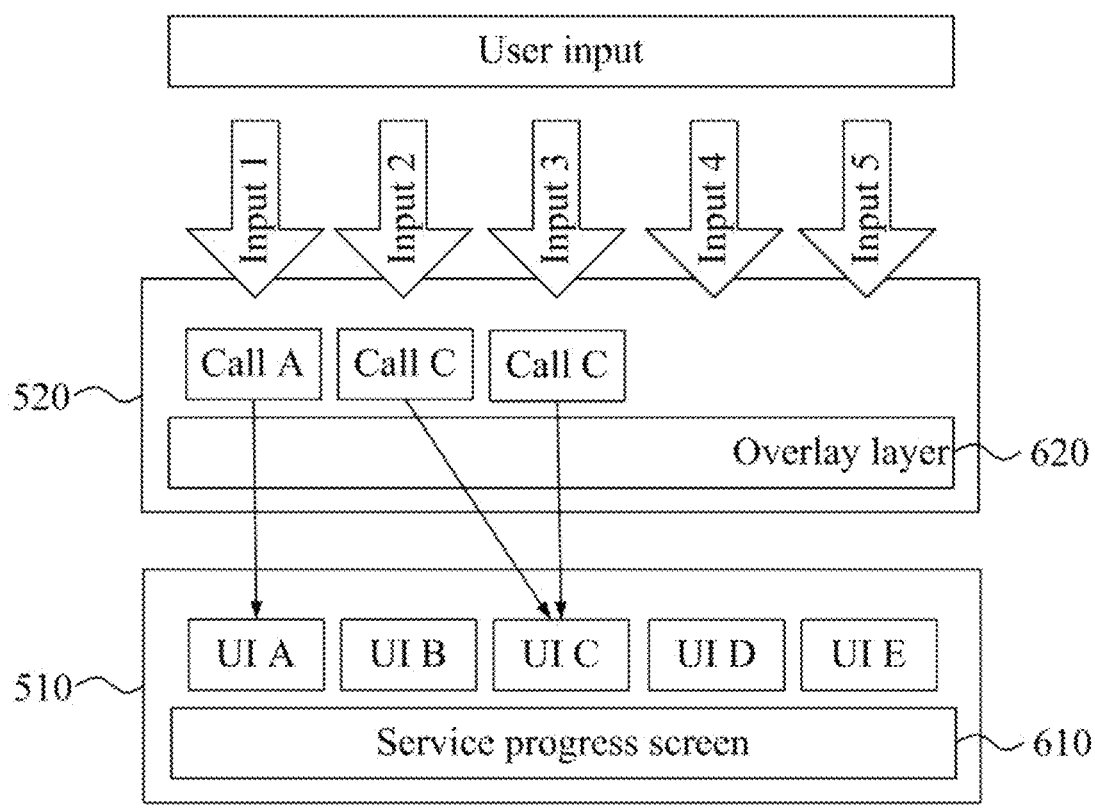

FIGS. 5 and 6 illustrate examples of a first virtual layer and a second virtual layer according to at least some exemplary embodiments.

FIG. 5 illustrates an example in which virtual layers including a first virtual layer 510 and a second virtual layer 520 may be overlappingly displayed on a screen of an electronic device 500. Instead of displaying the first virtual layer 510 and the second virtual layer 520 themselves to be visible for the user, objects, for example, an animation object or a user interface object at a game service, of the service or the additional service may be overlappingly displayed on the first virtual layer 510 and the second virtual layer 520. Here, the first virtual layer 510 may be a layer for displaying a service progress screen 610 of FIG. 6 and user interfaces. For example, game contents of the game service may be displayed through the service progress screen 610. Also, the second virtual layer 520 may display overlay information displayed on the first virtual layer 510 to provide the additional service.

FIG. 6 is an example of the first virtual layer 510 and the second virtual layer 520 observed from the side. FIG. 6 illustrates an example of the first virtual layer 510 configured to include the service progress screen 610 and a plurality of user interfaces, for example, UI A, UI B, UI C, UI D, and UI E. The user may be provided with the main service through the service progress screen 610 prior to being provided with the additional service, and may select a variety of control functions corresponding to the main service using user interfaces.

Once the additional service is provided in response to a preset condition being satisfied, the second virtual layer 520 may be provided overlapping the first virtual layer 510. Here, "call A" denotes a call function for calling a control function corresponding to "UI A" in response to a user input "input 1" on a corresponding area. The call function "call A" may hook the "input 1" and call the control function corresponding to ""UI A"." The user may provide ""input 2"" to select ""UI B."" However, referring to the additional service of FIG. 6, the input may be hooked by the call function "call C" to call the control function corresponding to "UI C." "Input 3" may be provided by the user to select "UI C.". In this case, the "input 3" may be hooked by the call function "call C" of the corresponding area, and call the control function corresponding to "UI C." An overlay layer 620 may prevent the user input from interacting with the corresponding area of the first virtual layer 510. For example, "input 4" and "input 5" may be prevented by the overlay layer 620 from interacting with the "UI D" and the "UI E.". In this case, a selection signal for "input 4" and "input 5" may not interact with the first virtual layer 510.

If a touch screen is provided, the user input may be received through a touch of the user on the touch screen. Also, in a PC environment or the like, the user input may be received in response to a selection input on a specific area of a screen using a mouse or a keyboard FIGS. 7, 8, and 9 illustrate examples of overlay display control for providing a tutorial as an additional service at a game service according to at least some exemplary embodiments.

Figure 7:
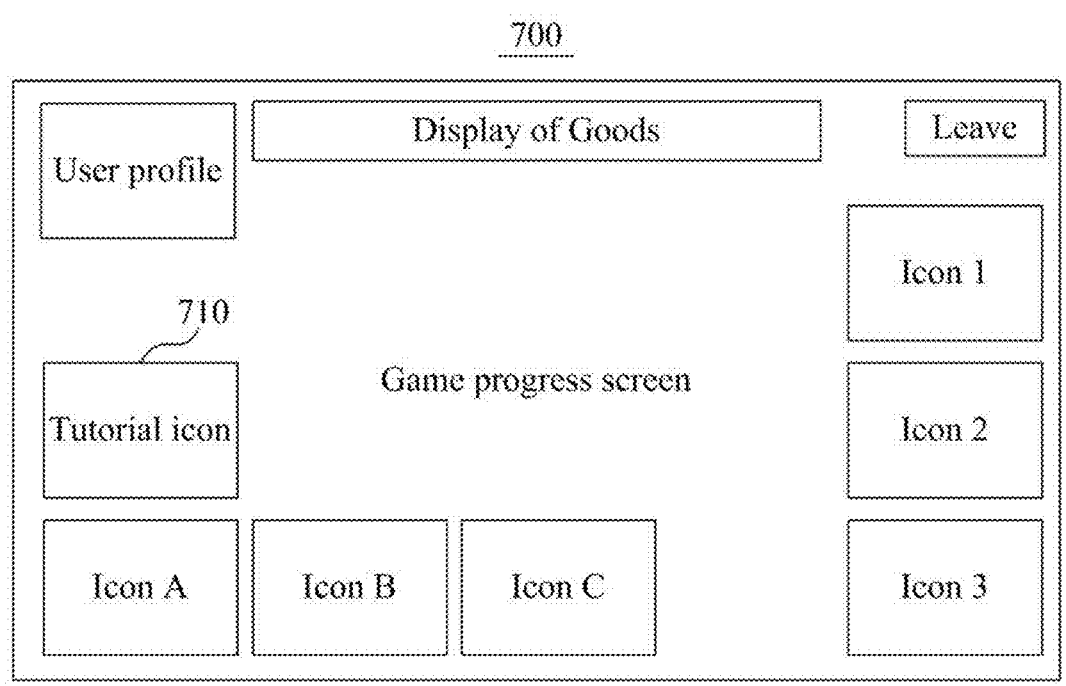
FIGS. 7, 8, and 9 illustrate examples of overlay display control for providing a tutorial as an additional service at a game service according to at least some exemplary embodiments.

FIG. 7 illustrates an example of a first screen 700 of the overlay display control for displaying a game progress screen and a variety of user interfaces through a first virtual layer. Here, in response to a selection on a tutorial icon 710 provided as a user interface, a tutorial of a game may be provided as an additional service.

Figure 8:
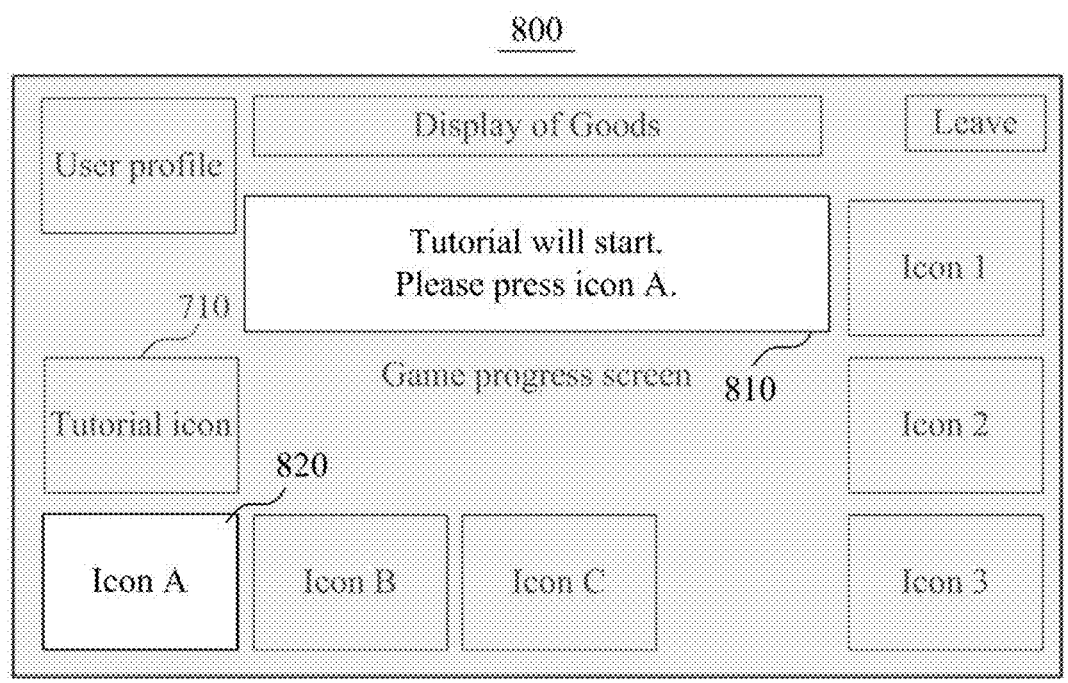
Figure 9:
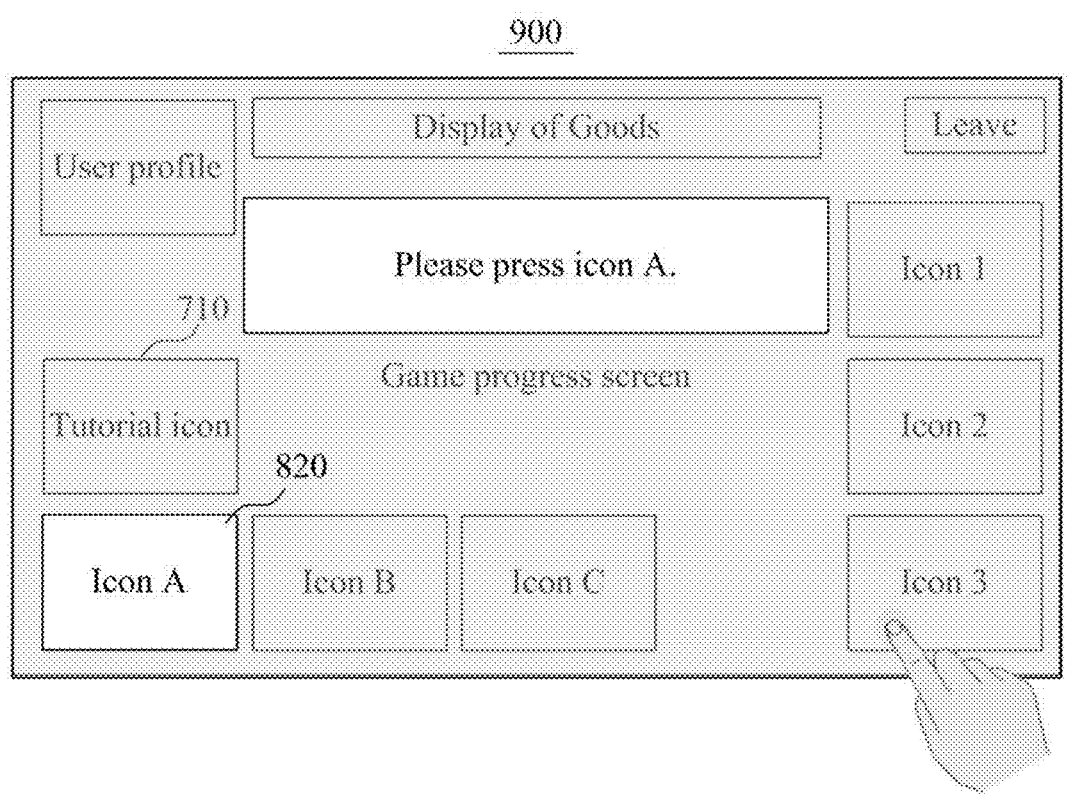

FIG. 8 illustrates an example of a second screen 800 of the overlay display control for providing an additional service through a second virtual layer. Referring to FIG. 8, an area 820 of a specific icon, for example, icon A is displayed distinctively from other areas together with a message 810 for a progress of a tutorial. A call function configure to call the control function corresponding to icon A may be set on the area 820. In response to a user touch on the area 820, the control function corresponding to the icon A may be called and the progress of the tutorial may be processed.

With respect to a remaining area excluding the area 820 on the second screen 800, the user input is prevented by the overlay layer 620 of FIG. 6 and thus, other icons in the remaining area cannot be selected by the user. A call function may be selectively disposed on the remaining area excluding the area 820 on the second screen 800. For example, a call function coupled with the remaining area may be configured to prevent a selection signal received on the remaining area from interacting with the corresponding control functions of the first virtual layer and display a message "please press icon A" on the screen.

FIG. 9 illustrates an example of a third screen 900 of the overlay display control for displaying a message "please press icon A" on a screen in response to a user press on "icon 3".

The overlay display control method according to exemplary embodiments may provide an additional service using the second virtual layer without changing the first virtual layer with respect to an existing service. That is, the overlay display control method may process displaying of a progress screen, prevention of a selection signal, hooking of the selection signal, calling of a control signal, and the like, through the second virtual layer, with respect to the additional service. Such process indicates that developers may provide the additional service by adding a source code for the second virtual layer without correcting the existing source code.

To this end, the first source code for the first virtual layer, the user interface, and the control function and the second source code for the second virtual layer and the call function, for example, a function for calling the control function may be separately generated. Here, the second source code may include a program code for controlling the electronic device 110 to receive the selection signal input on the partial area of the second virtual layer and call a control function corresponding to the partial area of the second virtual layer or a control function corresponding to the call function associated with the partial area using the first source code.

Figure 10:
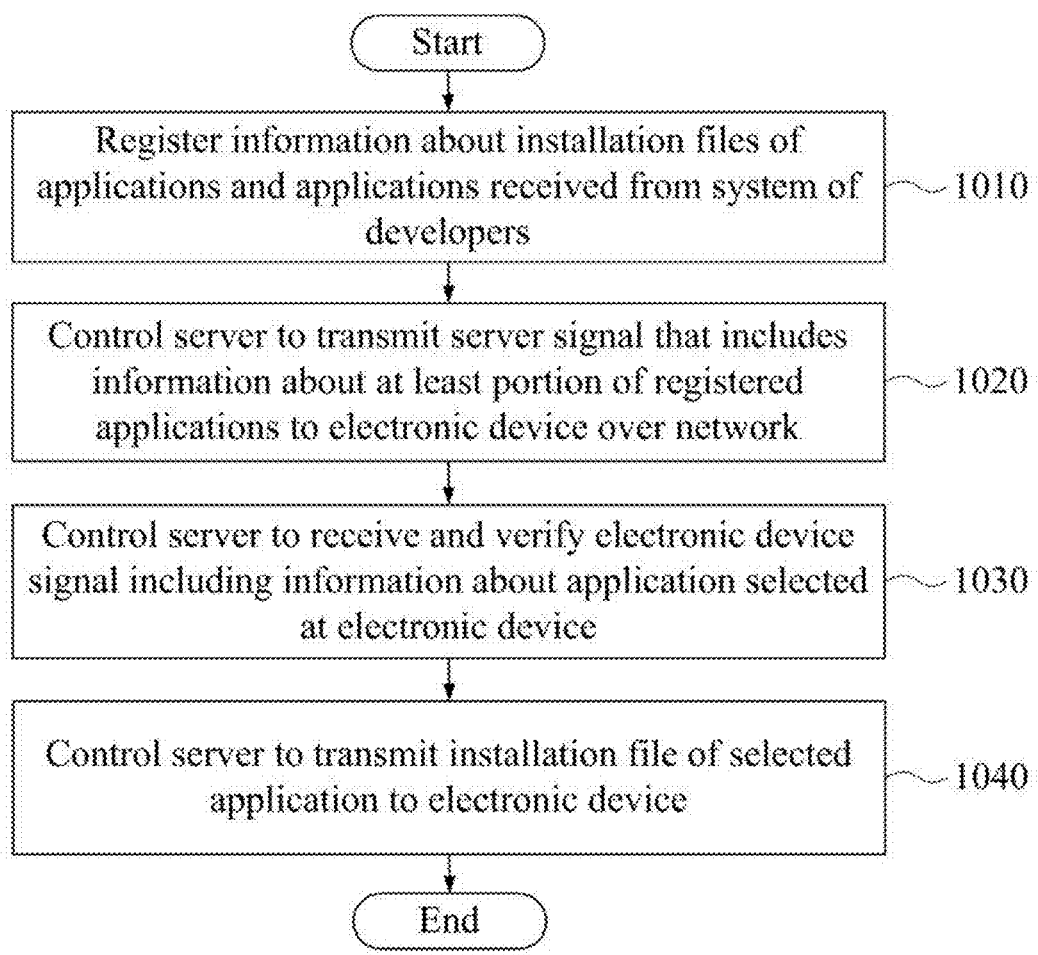
FIG. 10 is a flowchart illustrating an example of a overlay display control method performed at a server according to at least one exemplary embodiment.

FIG. 10 is a flowchart illustrating an example of a overlay display control method performed at a server according to at least one exemplary embodiment. Operations 1010 through 1040 included in the method of FIG. 10 may be performed at the processor 222 of the server 150. For example, the processor 222 may control the server 150 to perform operations 1010 through 1040, and may be configured to execute at least one program code and a code of an OS included in the memory 221 of the server 150.

In operation 1010, the processor 222 may register information about installation files of applications and the applications received from a system (not shown) of developers. For example, the server 150 may store and manage installations files and information transmitted from the system of developers in a database (not shown) in association with the corresponding applications.

In operation 1020, the processor 222 may control the server 150 to transmit a server signal that includes information about at least a portion of the registered applications to the electronic device 110 of the user over a network. For example, the server 150 may manage and provide a site or a page for downloading applications. In response to an access of the electronic device 110 to the site or a request from the electronic device 110 over the network, the server 150 may provide the server signal that includes information about at least a portion of the registered applications to the electronic device 110.

In operation 1030, the processor 222 may control the server 150 to receive and verify an electronic device signal including information about an application selected at the electronic device 110. For example, in response to a user selection on an application the user decides to download from among the applications of the provided server signal, information about the selected application may be transmitted to the server 150 via the electronic device signal and the server 150 may verify the transmitted information.

In operation 1040, the processor 222 may control the server 150 to transmit an installation file of the selected application to the electronic device 110. The application may be installed on the electronic device 110 through the transmitted installation file of the application. The electronic device 110 may process the overlay display control method under control of the application, which is described above with reference to FIGS. 3 and 4.

For example, the installation file may include a first source code and a second source code. Here, the electronic device 110 may process a progress of a main service using the first source code in response to execution of the application, and may process a progress of an additional service using the second source code if a preset condition is satisfied. In response to the progress of the additional service, the electronic device 110 may process the progress of the additional service by associating an input on a user interface displayed on a screen of the electronic device 110 to the first source code using the second source code, and by calling a control function of the first source code as preset at the second source code. For example, to execute a control function corresponding to an area on which a user input is received, the second source code may control the electronic device 220 to call a function of the first source code corresponding to the control function.

As described above, the main service may include a game service that is provided to the electronic device 110 through the application, and the additional service may include at least one of a tutorial and a quest that are additionally provided through the game service. In this case, the electronic device 110 may display a progress screen of the game service on the first virtual layer through the first source code and may display a progress screen of the tutorial or the quest on the second virtual layer through the second source code. Also, the electronic device 110 may process the progress of the tutorial or the quest by calling the control function of the game service, for example, by calling the function of the first source code through a call function associated with a partial area of the second virtual layer.

Also, the call function may be associated with the partial area of the second virtual layer, and an input for the remaining area excluding the set area may be prevented from directly interacting with the control function. The call function may call a control function corresponding to a user interface of the first virtual layer displayed on an area on which the input is received or may call a control function preset for the call function, for example, the partial area of the second virtual layer, regardless of the user interface of the first virtual layer displayed in the area on which the input is received.

According to some exemplary embodiments, the overlay display control may have simplified implementation including reduced in-code branch and source code amount, and may provide prompt application and production of an additional service by separately managing, processing, and analyzing an existing source code and a source code for the additional service. Accordingly, it is possible to reduce cost used for maintaining an existing game code. Further, it is possible to flexibly cope with quick application of the additional service and a decrease and a modification in relevant cost.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The exemplary embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular exemplary embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of providing an overlay display control, the method comprising:
    transmitting a server signal comprising information about at least a portion of registered applications to an electronic device of a user over a network;
    receiving an electronic device signal and verifying information about an application selected at the electronic device from the electronic device signal; and
    transmitting an installation file of the selected application to the electronic device,
    wherein the installation file comprises a first source code and a second source code,
    wherein the electronic device is configured to process a progress of a main service using the first source code in response to an execution of the application, and process a progress of an additional service using the second source code in response to the progress of the main service meeting a preset condition,
    wherein, in response to the progress of the additional service, the electronic device is configured to process the progress of the additional service by hooking an input on a user interface displayed on a screen of the electronic device to the first source code using the second source code, and by calling a control function of the first source code preset with the second source code,
    wherein the electronic device is configured to display a progress screen of the main service through a first virtual layer using the first source code, and display a progress screen of the additional service through a second virtual layer using the second source code, and
    wherein the electronic device is configured to hook an input received on a partial area of the second virtual layer using the second source code, and call a control function associated with the additional service associated with the main service corresponding to the partial area of the second virtual layer using the second source code.

2. The method of claim 1, wherein the main service comprises a game service provided to the electronic device through the application, and
    wherein the additional service comprises at least one of a tutorial and a quest that are additionally provided through the game service.

3. The method of claim 1, wherein the electronic device is configured to:
    block an input received on a remaining area excluding the partial area of the second virtual layer from interacting with the corresponding control functions of the first source code.

4. The method of claim 1, wherein the second source code controls the electronic device to call a control function corresponding to a user interface displayed on an area corresponding to the input.

5. The method of claim 1, wherein the second source code controls the electronic device to block the input from interacting with the user interface of the first virtual layer displayed on the area on which the input is received and call a control function preset with an area corresponding to the received input.

6. A system of a server for providing an overlay display control, the system comprising:
    a memory configured to store computer-readable instructions; and
    one or more processors configured to execute the computer-readable instructions,
    wherein the one or more processors are configured to control the server to provide information about at least a portion of registered applications to an electronic device of a user in response to a request received from the electronic device of the user over a network, and to transmit an installation file of an application selected at the electronic device to the electronic device over the network, wherein the installation file comprises a first source code and a second source code, wherein the electronic device is configured to process a progress of a main service using the first source code in response to an execution of the application and process a progress of an additional service using the second source code in response to the main service meeting a preset condition, wherein, in response to the progress of the additional service, the electronic device is configured to process the progress of the additional service by hooking an input received on a user interface displayed on a screen of the electronic device to the first source code using the second source code, and by calling a control function of the first source code preset with the second source code using the second source code, wherein the electronic device is configured to display a progress screen of the main service through a first virtual layer using the first source code, and display a progress screen of the additional service through a second virtual layer using the second source code, and wherein the electronic device is configured to hook an input received on a partial area of the second virtual layer using the second source code, and call a control function associated with the additional service associated with the main service corresponding to the partial area of the second virtual layer using the second source code.

7. The system of claim 6, wherein the main service comprises a game service provided to the electronic device through the application, and wherein the additional service comprises at least one of a tutorial and a quest that are additionally provided through the game service.

8. The system of claim 6, wherein the electronic device is configured to:

block an input received on a remaining area excluding the partial area of the second virtual layer from interacting with the corresponding control functions of the first source code.

9. The system of claim 6, wherein the second source code controls the electronic device to call a control function corresponding to a user interface displayed on an area corresponding to the input.

10. The system of claim 6, wherein the second source code controls the electronic device to block the input from interacting with the user interface of the first virtual layer displayed on the area on which the input is received and call a control function preset with an area corresponding to the received input.

* * * * *